United States Patent [19]

Lissau

[11] 4,120,314

[45] Oct. 17, 1978

[54] REMOTE ACTUATED FLUSH VALVE

[75] Inventor: Frederic Lissau, Chicago, Ill.

[73] Assignee: Sloan Valve Company, Franklin Park, Ill.

[21] Appl. No.: 767,740

[22] Filed: Feb. 11, 1977

[51] Int. Cl.² .............................................. F16K 43/00
[52] U.S. Cl. ................................. 137/329.4; 137/285;
137/360; 137/614.19; 251/DIG. 1; 251/360;
251/364
[58] Field of Search ................ 137/285, 300, 329.1,
137/329.2, 329.3, 329.4, 360, 614.19, 454.2;
251/41, 321, 322, 323, 172, 175, 360, 364, 365,
DIG. 1, 363

[56]  References Cited
U.S. PATENT DOCUMENTS

| 956,082 | 4/1910 | Hannigan | 137/329.4 |
| 1,011,093 | 12/1911 | Tanner et al. | 137/329.2 |
| 1,447,457 | 3/1923 | Yeiser | 137/329.2 |
| 1,768,212 | 6/1930 | Reedy | 137/329.4 |
| 1,787,947 | 1/1931 | Lehnert | 137/454.2 |
| 2,542,390 | 2/1951 | Brown | 251/DIG. 1 |
| 2,569,023 | 9/1951 | Sanford | 137/329.4 |
| 2,666,614 | 1/1954 | Grove et al. | 251/DIG. 1 |
| 2,989,990 | 6/1961 | Bass et al. | 251/172 |
| 3,617,027 | 11/1971 | Scaramucci | 251/175 |
| 3,695,288 | 10/1972 | Billeter et al. | 251/41 |

FOREIGN PATENT DOCUMENTS

| 2,404,174 | 1/1974 | Fed. Rep. of Germany | 251/360 |
| 51,605 | 9/1919 | Sweden | 137/329.4 |
| 20,776 of | 1896 | United Kingdom | 137/329.4 |

Primary Examiner—Martin P. Schwadron
Assistant Examiner—G. L. Walton
Attorney, Agent, or Firm—Kinzer, Plyer, Dorn & McEachran

[57]  ABSTRACT

A hydraulic actuator for use in operating a remotely located flush valve includes a housing having fluid inlet and outlet ports, each of which are connected to the flush valve through tubes or the like with the inlet port being under fluid pressure derived from the flush valve. There are passage means connecting the ports with first and second seal members being positioned in the passage means. A stem is movable in the housing with the first and second seal members being positioned on and movable with the stem. A spring positioned within the housing urges the stem toward a position in which the second seal member closes communication between the inlet and outlet ports. The first seal member is located closer to the inlet port than the second seal member and is removable from the stem. There is a seat for the first seal member with fluid pressure at the inlet urging the first seal member, after removal from the stem, toward the seat to close communication between the inlet and outlet.

4 Claims, 1 Drawing Figure

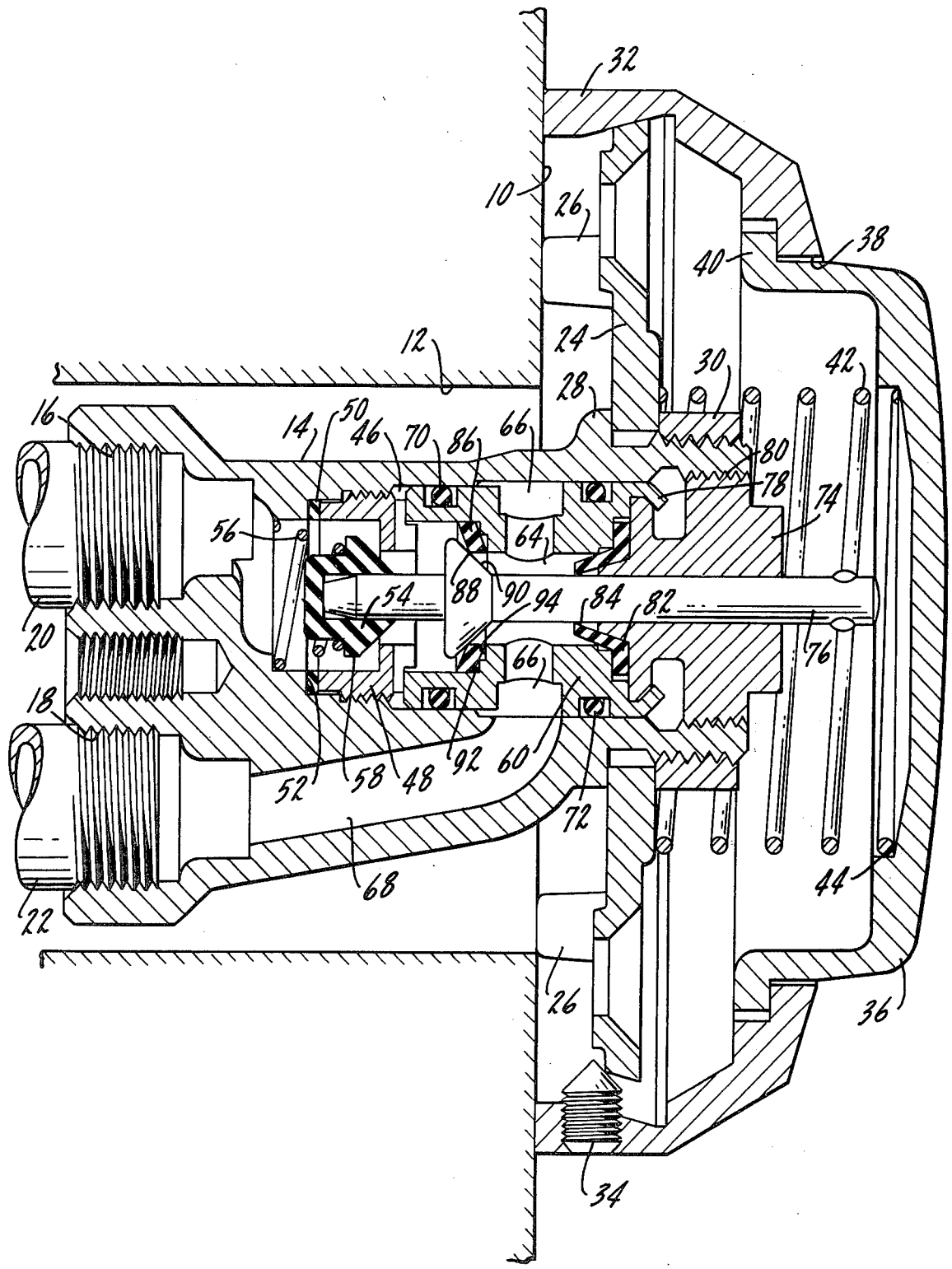

REMOTE ACTUATED FLUSH VALVE

SUMMARY OF THE INVENTION

The present invention relates to hydraulic actuators for remotely operated flush valves.

A primary purpose of the invention is a hydraulic actuator of the type described in which most of the elements of the actuator are embodied in a replaceable cartridge.

Another purpose is an actuator of the type described utilizing a pair of seal members, one of which provides a seal between inlet and outlet ports while the removable cartridge is being replaced.

Another purpose is an actuator for the use described which includes an exterior, easily removable wall mounting member.

Another purpose is a hydraulic actuator utilizing a loosely retained seal which functions as a check valve when a cartridge portion of the actuator is removed.

Another purpose is a simply constructed reliable operable flush valve operator.

Another purpose is a hydraulic actuator for use with remotely controlled flush valves utilizing a specially formed and adapted flexible valve seat member.

Other purposes will appear in the ensuing specification, drawing and claims.

BRIEF DESCRIPTION OF THE DRAWING

The invention is illustrated in the attached diagrammatic illustration of an actuator of the type described.

DESCRIPTION OF THE PREFERRED EMBODIMENT

The present invention relates to remotely actuated flush valves and in particular to the hydrulic actuator. The flush valve itself and the hydraulic means for operating it are not shown herein, but may be of the type shown in U.S. Pat. No. 3,695,288 or U.S. Pat. No. 3,778,023, both assigned to the assignee of the present invention.

In the drawing the wall of a washroom or the like is indicated at 10 and there may be an opening 12 in the wall. A housing 14 has an inlet port 16 and an outlet port 18, with the ports 16 and 18 being connected to tubes 20 and 22, respectively. Inlet port 16 and its associated tube 20 will be connected to the flush valve so that pressure derived from the flush valve is always present at inlet port 16. When the actuator is operated, as described herein, pressure from inlet port 16 is conveyed to outlet port 18 and thence through tube 22 to cause operation of the flush valve in the manner described in one or the other of the above two patents.

A wall flange member 24 has a plurality, for example three, spacer members 26 which rest upon the surface of wall 10 and properly space the wall flange from it. Housing 14 may have a shoulder 28 which properly positions the housing relative to the wall flange. A mounting nut 30 is threaded onto a portion of housing 14 and holds the wall flange to the housing and thus mounts the housing to wall 10. A button flange 32 extends about the periphery of wall flange 24 and is fastened thereto by means of a set screw 34. A button 36 is positioned within a central opening 38 in button flange 32 and has a peripherally outwardly extending shoulder 40 which serves to hold the button to the button flange and to permit reciprocal movement of the button relative thereto. A coil spring 42 is seated upon wall flange 24 and normally urges button 36 to the outward position of the drawing. Spring 42 may have its outward coil positioned within a recess 44 in button 36.

Housing 14 may have a chamber 46 within which is positioned a retainer 48. The retainer may be threaded into a threaded portion of chamber 46. A gasket 50 may be positioned between an interior surface of retainer 48 and a shoulder 52 formed in the chamber. A first seal member 54 is positioned within the retainer and is urged toward the position shown in the drawing by a coil spring 56 having one coil bottomed upon a shoulder within the chamber and a coil at the opposite end bearing against an outwardly extending flange 58 on first seal member 54.

A body member 60 is positioned within chamber 46 and has a generally central bore 64 communicating with the interior of retainer 48. A pair of laterally extending passages 66 communicate with bore 64 and with a housing passage 68 connected to outlet port 18. The exterior of body member 60 may mount seal rings 70 and 72 which bear against the wall of chamber 46.

A stem bushing 74 mounts a reciprocal stem 76 and is attached to body member 60 by means of a bent-over flange 78 on the body member. Stem bushing 74 may further be threaded into housing 14 by a threaded connection indicated at 80. A stem packing 82 is positioned between adjacent surfaces of the stem bushing and the body member, forming a seal therebetween and having an annular lip 84 which seals against the reciprocal stem.

Positioned within chamber 64 of the body member is an annular seat member 86 having an inner annular lip 88 bearing against a conical seal member 90 on the stem. That portion of the body member which supports seat member 86 includes an annular shoulder 92 and an axially recessed portion 94 adjacent shoulder 92. In its relaxed position seat member 86 has its peripheral portion lying flush against shoulder 92, providing a space behind the peripheral inward portion 88. The seat member is not retained mechanically within the body member, but instead pressure from the inlet direction is effective to hold the seat member in the position shown. The area behind the seat member, recess 94, is vented. The venting area prevents pressure buildup behind the seat which can in fact cause it to pop out of the position shown. The seat bends at the point where it contacts the corner of the support structure, junction of shoulder 92 and recess 94.

In operation, fluid presure will be present at all times at inlet port 16 and when the actuator is in the position shown, conical seal 90 on the stem forms a seal with seat member 86 preventing fluid pressure from the inlet port from passing through the body member and passage 68 to outlet port 18. First seal member 54 is slightly spaced from the wall of the retainer and there is not a seal at this point. The stem is held in the retained closed position by means of coil spring 56. When it is desired to operate the valve, inward pressure on button 36, after it has moved a distance to close upon stem 76, will cause the stem to move inward, thus placing inlet port 16 in communication with outlet port 18 through retiner 48, body member 60 and housing passage 68. After the flushing opeation is completed, and the button has been released, all parts will return to the position shown.

Of particular advantage is the ease of servicing the actuator. Set screw 34 is backed off which releases the button flange and the button from the wall flange. In this connection it should be noted that there is only a single set screw holding the described structure together. Also, the centerline of the button will be eccentrically located relative to the centerline of the cartridge and stem, as when the set screw is turned in it will cause the button flange and button to move slightly off of the cartridge centerline. Such a slight offset is not noticebable outside of the actuator and there is no indication of such an eccentric arrangement. However, this arrangement does permit ease of assembly and disassembly. Once the set screw is backed off and the button flange and button removed, the exterior portion of stem bushing 74 is accessible. The outward portion of the stem bushing may have a hex-shaped structure so that a wrench or the like may be easily applied thereto. As the stem bushing is turned in its threaded mounting 80, the stem bushing, stem and body member will all be removed, as a single replaceable unit. Thus, if there is a leak or some difficulty with the actuator, the device may quickly be put back in sevice by replacing, as a cartridge, the body member, stem bushing and stem.

When the stem bushing and body member are removed, fluid pressure at port 16 and spring 56 will force first seal member 54 into a sealing position against the wall of the retainer, thus closing off the fluid pressure within suply line 20. Once the stem bushing and body member and stem have been replaced, the inward tapered end of the stem will again be inserted into seal member 54 with the result that the first seal member is once again mounted on the stem. Thus, seal member 54, upstream from concical seal 90, is effective to close the actuator in the event that the cartridge is removed for servicing. Normally, seal member 54 is slightly spaced from the wall of the retainer and does not itself normally perform a sealing function.

Retainer 48, seal member 54 and coil spring 56 themselves form a unit which is mounted in the actuator housing 14 by means of the threaded connection shown.

The entire actuator is simply constructed, reliably operable and easy to service. A single set screw holds the exterior decorative portions of the actuator permitting easy removal thereof. Once the button flange and button have been removed there is easy access to a single replaceable cartridge which holds the operating members of the actuator. These may be removed with the remaining seal member closing off the supply of water present in the pressurized inlet pipe until such time as the replaceable cartridge is again inserted and the stem positioned within seal member 54.

Whereas the preferred form of the invention has been shown and described herein it should be realized that there may be many modifications, substitutions and alterations thereto.

The embodiments of the invention in which an exclusive property or privilege is claimed are defined as follows:

1. A hydraulic actuator for use in operating a remotely located flush valve including a housing, fluid inlet and outlet ports in said housing adapted to be connected to a flush valve, said inlet port normally being under fluid pressure derived from the flush valve, passage means in said housing connecting said ports,
   a retainer member attached to said housing and positioned in said passage means,
   a sleeve positioned in said passage means and in coaxial alignment with said retainer member,
   a stem reciprocally positioned in said retainer and said sleeve and said stem extending outward from said housing,
   first and second seal members positioned on said stem, said first seal member being located closer to said inlet port than said second seal member,
   said first seal member being loosely held in said retainer member and a first seat defined by said retainer member in said passage means for said first seal member,
   a flexible second seat member positioned in said passage means for contact by said second seal member,
   support means for said second seat member located on the interior surface of said sleeve, said support means comprising an annular shoulder and a relieved area, said relieved area being downstream of said shoulder to prevent pressure build-up downstream of said second seat member,
   spring means positioned in said passage means and urging said sealing members toward said seats,
   said first and second seal members being positioned on said stem in spaced relationship whereby said first seal member is in an open position when said second seal member is in a sealing position, fluid pressure at said inlet urging said first seal member, after removal from said stem, against said first seat to close communication between said inlet and outlet ports.

2. The structure of claim 1 further characterized by support means holding the outer periphery of said second seat member while permitting flexure of portions radially inward thereof.

3. The structure of claim 1 further characterized by and including a flange extending peripherally about said housing, a button reciprocally mounted in said flange, said button being positioned to cause movement of said stem, said flange and button being eccentrically mounted relative to the centerline of said stem, a wall mounting member secured to said housing, and means for removably mounting said flange to said wall mounting member.

4. The structure of claim 1 further characterized in that said sleeve, said stem, said second seal member, and said second seat form a portion of a replaceable cartridge insertable in said housing.

* * * * *